(12) United States Patent
Mathew et al.

(10) Patent No.: US 11,516,037 B2
(45) Date of Patent: *Nov. 29, 2022

(54) METHODS TO OPTIMIZE MULTICAST ROUTING IN OVERLAY NETWORKS

(71) Applicant: Nicira, Inc., Palo Alto, CA (US)

(72) Inventors: Subin Cyriac Mathew, Santa Clara, CA (US); Alexander Tessmer, San Jose, CA (US); Sami Boutros, Union City, CA (US); Chidambareswaran Raman, Campbell, CA (US)

(73) Assignee: Nicira, Inc., Palo Alto, CA (US)

( * ) Notice: Subject to any disclaimer, the term of this patent is extended or adjusted under 35 U.S.C. 154(b) by 373 days.

This patent is subject to a terminal disclaimer.

(21) Appl. No.: 16/792,719

(22) Filed: Feb. 17, 2020

(65) Prior Publication Data

US 2020/0186376 A1     Jun. 11, 2020

Related U.S. Application Data

(63) Continuation of application No. 15/868,871, filed on Jan. 11, 2018, now Pat. No. 10,567,187.

(51) Int. Cl.
*H04L 12/18* (2006.01)
*H04L 47/12* (2022.01)
*G06F 9/455* (2018.01)

(52) U.S. Cl.
CPC ...... *H04L 12/1886* (2013.01); *G06F 9/45558* (2013.01); *H04L 47/12* (2013.01); *G06F 2009/4557* (2013.01); *G06F 2009/45595* (2013.01)

(58) Field of Classification Search
CPC .. H04L 12/1886; H04L 47/12; G06F 9/45558
See application file for complete search history.

(56) References Cited

U.S. PATENT DOCUMENTS

| | | | |
|---|---|---|---|
| 8,619,771 B2 | 12/2013 | Lambeth et al. | |
| 9,350,657 B2 | 5/2016 | Gross, IV et al. | |
| 9,432,204 B2 | 8/2016 | Shen et al. | |
| 2003/0217183 A1 | 11/2003 | Rimmer et al. | |
| 2016/0232019 A1 | 8/2016 | Shah et al. | |
| 2017/0250954 A1 | 8/2017 | Jain et al. | |
| 2019/0068555 A1 | 2/2019 | Tsirkin et al. | |
| 2019/0081899 A1 | 3/2019 | Mundkur et al. | |
| 2019/0097839 A1* | 5/2019 | Narayanan | H04L 12/4633 |

* cited by examiner

*Primary Examiner* — Ronald B Abelson
(74) *Attorney, Agent, or Firm* — Dinsmore & Shohl LLP

(57) ABSTRACT

The disclosure provides an approach for reducing multicast traffic within a network by optimizing placement of virtual machines within subnets and within hosts, and by optimizing mapping of overlay multicast groups to underlay multicast groups. In one embodiment, substantially all VMs of a multicast group are migrated to the same subnet of the network. Thereafter or independently, VMs in the same subnet are migrated to the same host, ideally to the subnet proxy endpoint of that subnet. In the same or in another embodiment, if multiple overlay groups map to the same underlay group, one or more of the overlay groups may be remapped to a separate underlay group to improve network performance.

15 Claims, 14 Drawing Sheets

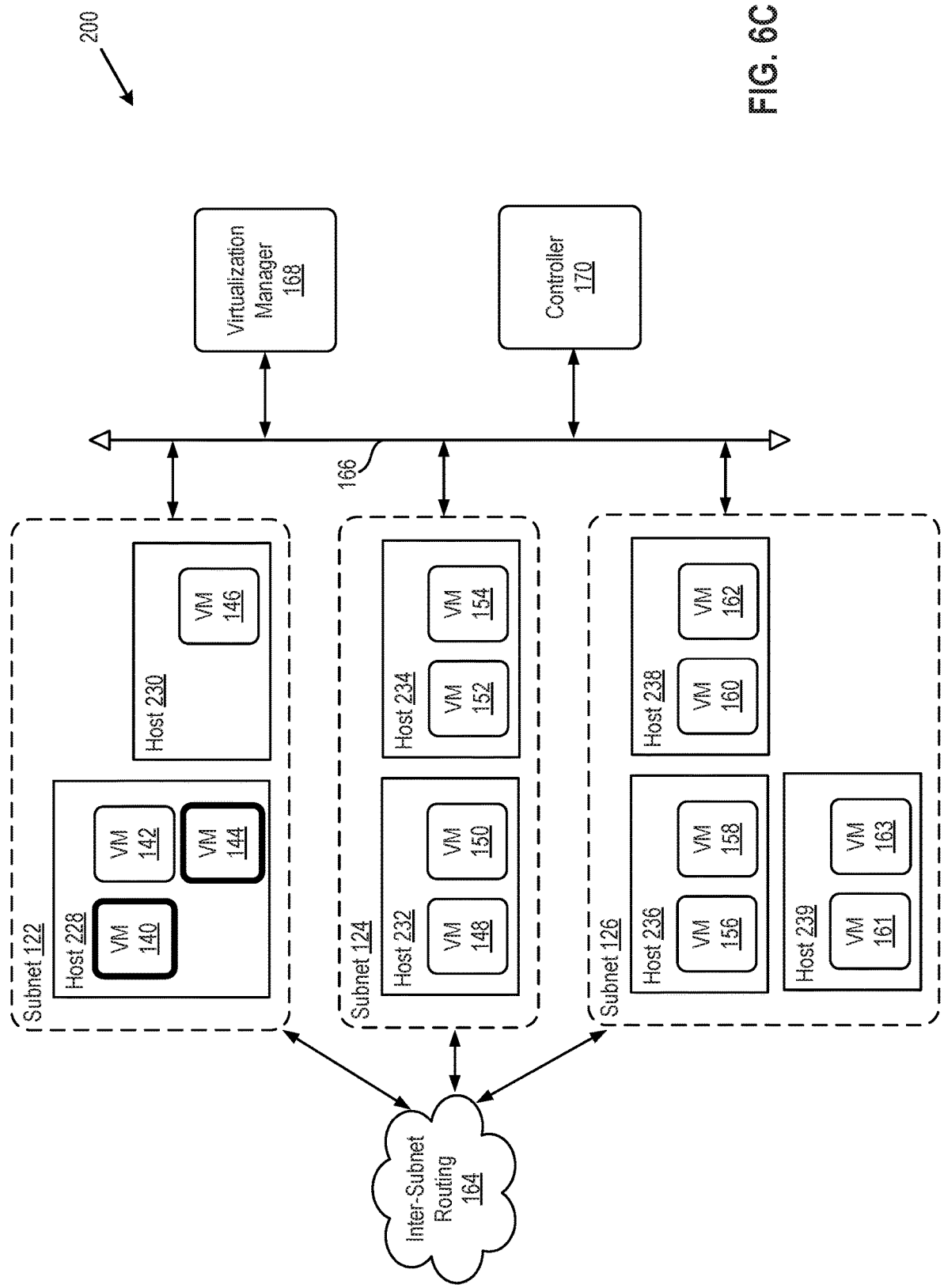

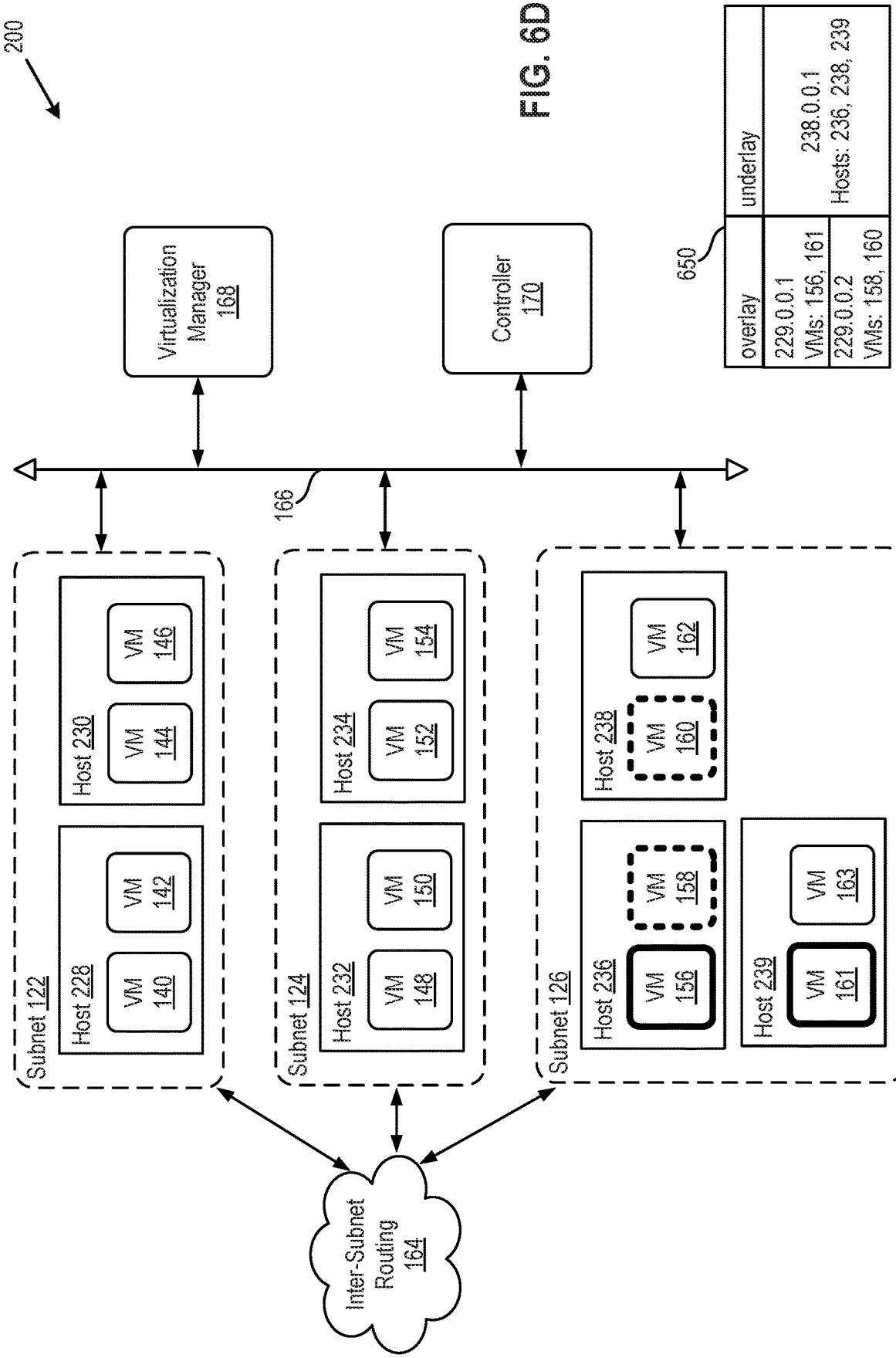

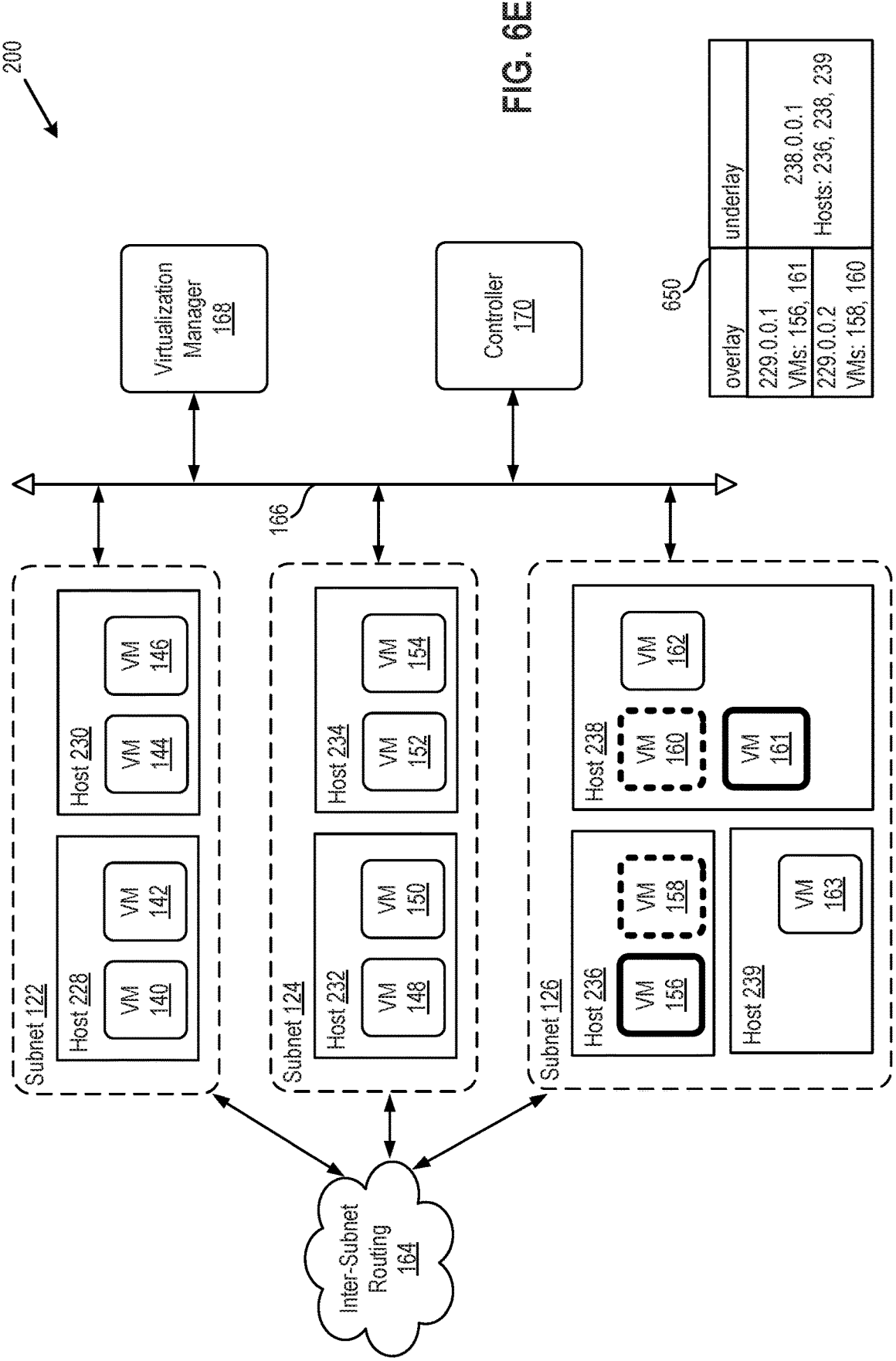

METHODS TO OPTIMIZE MULTICAST ROUTING IN OVERLAY NETWORKS

CROSS-REFERENCE TO RELATED APPLICATIONS

This application is a continuation of U.S. patent application Ser. No. 15/868,871, filed Jan. 11, 2018, which is hereby incorporated by reference herein in its entirety.

BACKGROUND

Multicast is the delivery of a message or information to a group of destination computers simultaneously in a single transmission from the source. Copies of the message are automatically replicated and forwarded by other network elements. Forwarding and replicating multicast packets are usually done by intermediate nodes in the network—switches fulfill multicast forwarding inside a layer 2 network while (multicast) routers fulfill multicast routing across layer 3 networks. Typically, switches that support multicast use either Internet Group Management Protocol (IGMP) snooping or Multicast Listener Discover (MLD) snooping. Switches may use IGMP snooping for Internet Protocol version 4 (IPv4), and switches may use MLD snooping for IPv6. Routers that support multicast use Protocol Independent Multicast (PIM) as the routing protocol. Although certain aspects are described with respect to certain protocols, it should be noted that other appropriate protocols may also be used herein.

Although previously not very many applications used multicast, many Internet protocol (IP) multicast applications have been developed and deployed, like financial software, video service, etc. A use case worth noting is overlay based network virtualization (layer 2 tunneling), with virtual extensible local area network (VXLAN) being an important technology. VXLAN can support a large number of logical layer 2 networks over a physical IP network. It is based on MAC-over-UDP encapsulation, and requires an IP multicast group to be allocated for encapsulation of BUM (broadcast, unknown unicast, and multicast) traffic inside a logical network. As a result, a large number of multicast groups may be consumed, especially in a cloud environment in which each tenant may create a number of logical networks. These created logical networks and corresponding multicast groups may span across physical layer 3 networks and even datacenters. Other tunneling protocols, besides VXLAN, may also be used, such as Stateless Transport Tunneling (STT), Generic Network Virtualization Encapsulation (GENEVE), or Generic Routing Encapsulation (GRE).

In virtualized computing systems, host machines generally host a plurality of virtual machines. In hosting virtual machines, a host machine may provide a virtual switch that connects virtual machines running on the host to communicate with other virtual machines hosted on the same host machine as well as virtual machines hosted on other hosts. For example, the virtual machines may be interconnected as part of a logical overlay network. Logical overlay networks may be implemented by the host by encapsulating egress packets from the virtual machines and decapsulating ingress packets. For example, VXLAN tunnel endpoint (VTEP) services for encapsulating packets may be implemented at each host or at a gateway. Edge VTEPs or hypervisor-based VTEPs are generally connected to virtual switches implemented by the hypervisor for virtual machines on the same physical host. While the term "VTEP" refers to "VXLAN" tunneling protocol, it is now often used regardless of the tunneling protocol. The host may refer to internally-maintained forwarding tables that are populated by a control plane for determining whether to encapsulate packets and the targets of the encapsulation header based on the destination address of the original packet's header.

Receiver endpoints of physical ("underlay") networks may be physical endpoints, such as host computers. Receiver endpoints of logical ("overlay") multicast groups may be virtual machines (VMs) or processes running on VMs. One or more overlay multicast groups are mapped to an underlay multicast group, similarly to the way virtual addresses are mapped to physical addresses in the functioning of virtual memory within conventional operating systems.

Inefficiencies may arise in the placement of VMs that are part of a multicast group. The VMs of a multicast group may be distributed among subnets and hosts of a network in a suboptimal manner. For example, multiple subnets may receive multicast messages for only a few VMs within each subnet, increasing congestion within the network. In another example, hosts that are not part of a multicast group may receive a multicast message for that group, only to ignore the message. This wastes host resources and also increases network congestion. VM placement may be rearranged throughout the network to lower network traffic and to make multicast message delivery more targeted to the intended receivers.

SUMMARY

Embodiments provide a method of reducing congestion within a network, the network comprising a plurality of host machines and a plurality of virtual machines (VMs) running on the plurality of host machines, the method comprising, for a first overlay multicast group comprising a first set of VMs of the plurality of VMs, determining at least one of (a) if the first set of VMs spans a plurality of subnets including a first subnet and a second subnet; or (b) if the first set of VMs run on multiple host machines of the plurality of host machines including a first host machine and a second host machine, wherein the multiple host machines are in a same subnet. When it is determined that the first set of VMs spans the plurality of subnets, migrating at least one VM of the first set of VMs from the first subnet to the second subnet, such that the first subnet no includes any of the first set of VMs. When it is determined that the first set of VMs run on the multiple host machines, migrating at least one VM of the first set of VMs from the first host machine to the second host machine, such that the first host machine no longer hosts any of the first set of VMs.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

FIG. 6C depicts a block diagram of a first exemplary arrangement of network components after a first exemplary execution of the method of FIG. 6A.

FIG. 6D depicts a block diagram of a second exemplary arrangement of network components prior to a second exemplary execution of the method of FIG. 6A.

FIG. 6E depicts a block diagram of a second exemplary arrangement of network components after a second exemplary execution of the method of FIG. 6A.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for reducing congestion within a network by placing substantially all endpoints of multicast traffic within the same subnet. Congestion within a subnet is reduced further by placing substantially all endpoints within the same physical host, ideally within the host that is designated as the receiving host for multicast traffic arriving at that subnet. Also, network performance may be improved by remapping overlay multicast groups to underlay multicast groups in a way that reduces network multicast traffic.

Figure 1:
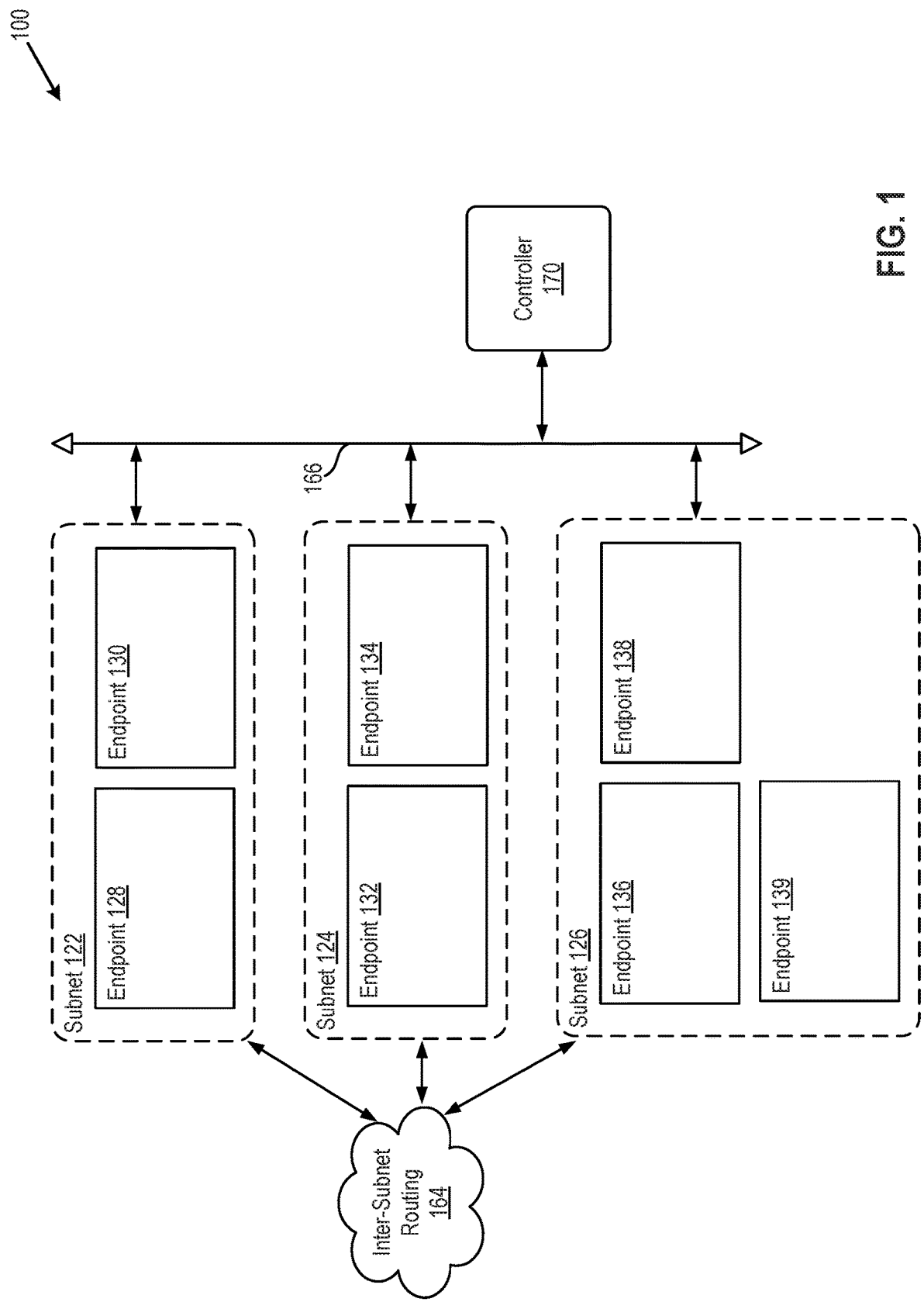
FIG. 1 depicts a block diagram of a physical network.

FIG. 1 depicts a block diagram of a physical network 100. Network 100 is divided into one or more subnets 122-126. A subnet may be defined as a logical subdivision of an IP network, such that the nodes within the subdivision do not need to communicate through a router. Subnets 122-126 of network 100 may include a collection of endpoints 128-139. Within the same subnet, endpoints may be addressed with a common, identical, most-significant bit-group in their IP address. A network with subnets typically has IP addresses that may be divided into two fields: (1) a network number or routing prefix, and (2) the rest field or host identifier. For example, endpoint 128 and endpoint 130, which are on the same subnet 122, may have the IP addresses 223.1.1.1 and 223.1.1.2, respectively, and may communicate with each other without sending packets through a router. The network number of endpoints 128 and 130 is 223.1.1, while the host identifier for endpoint 128 is 1, and for endpoint 130 is 2.

In some embodiments, a subnet may be a VLAN (Virtual Local Area Network) or an IP subnet inside a VLAN. In some embodiments, a VLAN contains only one IP subnet. In some embodiments, multiple IP subnets are allocated in a VLAN. In some embodiments, a network subnet includes a set of adjacent VLANs that have high bandwidth and/or low cost links between each other.

In some embodiments, a subnet is a "multicast island." A multicast island may be a physical network that supports IP-multicast, or a physical network in which all routers support multicast routing protocols. In some embodiments, a subnet is a multicast island that is a VLAN, in which IGMP snooping is supported by switches while multicast routing is not supported by routers, and hence multicast forwarding is limited to be inside a VLAN. In some embodiments, a multicast island includes multiple VLANs and subnets. Such a multicast island in some embodiments includes internal routers (or layer 3 switches) that support multicast routing, so multicast traffic can be routed among the internal VLANs, but cannot be routed out of the island or into the island from the outside.

Subnets 122-126 of network 100 may include a collection of endpoints 128-139. In an embodiment, a network endpoint may be an entity that generates and receives data traffic on the network 100. Such an entity may be a computing device, data storage, or a device of another type that provides or consumes data traffic on the network. In some embodiments, each subnet 122-126 is able to support multicast traffic between the encompassed multicast endpoints 128-139. In some embodiments, at least some of the subnets 122-126 do not support multicast traffic and must rely on unicast to replicate and forward multicast packets to each receiver endpoint in a multicast group.

On physical network 100, a "multicast group" is comprised of physical endpoints 128-139 or a subset of physical endpoint 128-139. A multicast group is designated by a multicast IP address. A multicast IP address is assigned by controller 170, and controller 170 keeps track of membership within a multicast IP, as further discussed below.

Network 100 includes a controller 170 that collects and distributes information about the network from and to endpoints in the network. Controller 170 communicates with endpoints 128-139 via management network 166. In some embodiments, controller 170 is a central controller for all subnets of network 100. Controller 170 collects, stores, and/or distributes to endpoints information about membership within multicast groups of network 100. In some embodiments, controller 170 includes one or more computing devices that collect information submitted from individual endpoints 128-139 and store the collected information as tables or directories for multicast groups. In some embodiments, controller 170 receives and distributes such information through the physical infrastructure provided by network 100.

In some embodiments, controller 170 communicates with individual endpoints 128-139 through control plane protocols. In some other embodiments, the communication between controller 170 and individual endpoints in different subnets 122-126 takes place in communication pathways that are independent of network 100. In some embodiments, controller 170 selects a subnet proxy endpoint for each subnet for each multicast group based on the information collected by controller 170. In some embodiments, endpoints 128-139 themselves select their own multicast subnet proxy endpoint based on the information distributed to them by controller 170.

A "subnet proxy endpoint" is an endpoint within a subnet that receives all multicast traffic destined for the subnet within which the subnet proxy endpoint is located. In an embodiment, a "subnet proxy endpoint" may be fixed within each subnet 122-126 for all multicast traffic. In other embodiment, a subnet proxy endpoint may be chosen dynamically by sender, controller 170, or another component or set of components within network 100.

To explain a subnet proxy endpoint further, multicast replication by endpoints 128-139 may include the following three steps: (1) local replication in the source subnet, in which a multicast packet is sent to local receiver endpoints in the same subnet as the sender endpoint; (2) cross-subnet replication, in which the packet is sent to the subnet proxy endpoint of every remote subnet that has receiver endpoints of the multicast group; (3) local replication in remote subnets, in which the packet is sent to every receiver endpoint in the remote subnet. A receiver endpoint is an endpoint that is a member of a given multicast group. Steps (1) and (2) are initiated by the sender endpoint. At step (2), the sender endpoint sends the packet to one endpoint (the "the subnet proxy endpoint") in every remote subnet with receiver endpoints. At step (3), after receiving the replicated packet, the subnet proxy endpoint will send the packet to every receiver endpoint within its multicast group, within its subnet.

For example, assume that endpoints 128 and 132 are within the same multicast group, and that the multicast IP address of this group is 229.0.0.1. Assume that endpoint 130 is the sender and that the subnet proxy endpoint of subnet 124 is endpoint 134. As per step (1) above, a packet will originate from endpoint 130 of subnet 122 and will be replicated by endpoint 130 and sent to endpoint 128 within subnet 122. As per step (2) above, endpoint 130 will replicate the packet for each subnet other than its own that has receiver endpoints. Endpoint 130 will send a packet to endpoint 134. Endpoint 134 is not a member of multicast group 229.0.0.1, but it receives the packet because it is the subnet proxy endpoint of its subnet, and because its subnet has a receiver endpoint, which is endpoint 132. Endpoint 134 sends the packet to endpoint 132, which processes the packet.

A detailed description of how multicast packet routing may be implemented within network 100, as well as a detailed description of methods of choosing a subnet proxy endpoint, is provided in U.S. Pat. No. 9,432,204, issued Aug. 30, 2016 and entitled "Distributed Multicast by Endpoints," which is incorporated herein by reference in its entirety.

In an embodiment, multicast IP addresses are assigned by controller 170 from a range of multicast IP addresses, such as 224.0.0 to 239.0.0, and any IP address within that range is known by components of network 100 to be a multicast IP address. For example, if endpoints 128, 132 and 136 are all within the multicast IP group of 225.1.2, then any packet sent to IP address 225.1.2 will reach all endpoints within that group, namely endpoints 128, 132, and 136.

In physical network 100, replication and forwarding of multicast messages is different among endpoints of a same subnet as compared to replication and forwarding between endpoints across different subnets. For example, in some embodiments, cost of network communication between endpoints of a same subnet is less than between endpoints of different subnets. In some embodiments, network 100 supports higher communication bandwidth between endpoints of a same subnet than between endpoints in different subnets. In some embodiments, a subnet is defined by the multicast capabilities of the physical network. In some of these embodiments, multicast traffic within a subnet can reliably utilize the multicast capability of the physical network, while multicast traffic across subnets is either not supported by the physical network at all or is supported in a more limited fashion.

Inter-subnet routing 164 is a set of network components that provide communication pathways among subnets 122-126. In an embodiment, inter-subnet routing 164 includes at least one router (not shown). Data traffic between the subnets 122-126 flows through inter-subnet routing 164, and in an embodiment, inter-subnet routing 164 comprises the "data path" of network 100 while network 166 comprises the "control path" of network 100. In some embodiments, multicast traffic that takes place within each subnet cannot be directly routed across inter-subnet routing 164, or cannot be routed over without incurring additional cost in terms of time, bandwidth, or computing power. In some embodiments, inter-subnet routing 164 includes data centers or provider networks that do not allow multicast traffic. In some of these embodiments, the multicast traffic of subnet 122-126 can only propagate through the inter-subnet routing 164 as unicast traffic, specifically to subnet proxy endpoints in different subnets.

Figure 2:
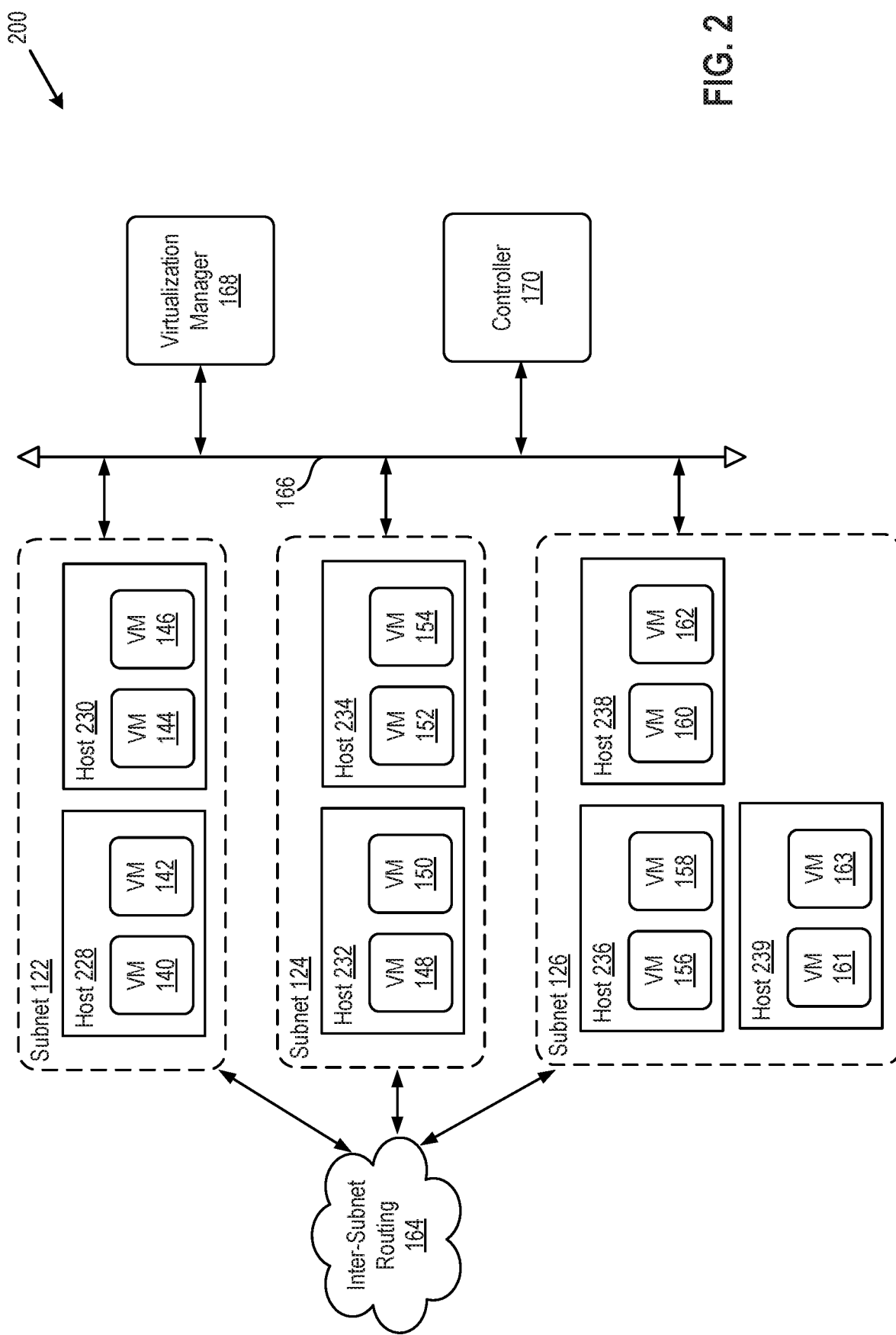
FIG. 2 depicts a block diagram of physical and virtual components of a network in which one or more embodiments of the present disclosure may be utilized.

FIG. 2 is a block diagram depicting physical and virtual components of network 200, in which one or more embodiments of the present disclosure may be utilized. Network 200 includes implementation of a logical VM network that connects VMs 140-163 over physical network 100 of FIG. 1. The logical VM network is for data communication among VMs 140-163. Although certain embodiments are described herein with respect to VMs, the same principals and techniques may also apply to other appropriate virtual computing instances (e.g., containers (e.g., Docker containers), data compute nodes, isolated user space instances, namespace containers, etc.).

VMs 140-163 run on host machines 228-239 via hypervisors running on those host machines. Host machines 228-239 are analogous to endpoints 128-139 of FIG. 1 in that hosts 228-239 are a specific type of endpoint 128-139. An exemplary host is described below with reference to FIG. 3. Hosts 228-239 are communicatively connected to the physical or "underlay" network 100. As used herein, the term "underlay" is synonymous with "physical" and refers to physical components of network 200. As used herein, the term "overlay" is used synonymously with "logical" and refers to the logical VM network implemented within network 200 of FIG. 2.

Physical components of network 200 are similar to physical network 100 of FIG. 1. Physical components of network 100 may include one or more network subnets 122-126, and host machines 128-139 (or the hypervisors running on those host machines) are endpoints connected to different subnets of network 200. Physical components of network 200 are capable of supporting multicast traffic, whether by utilizing built-in multicast capabilities provided by some of the physical components (e.g., multicast island) or by performing unicast across parts of the network that do not support multicast (e.g., data centers and provider networks). Physical components of network 200 are also able to communicate with external networks via a gateway (not shown).

Network 200 includes a management component, depicted in FIG. 2 as virtualization manager 168, that may communicate to the one or more hosts 228-239 via a network 166, sometimes referred to as a management network. In one embodiment, virtualization manager 168 is a computer program that executes in a central server in network 100, or alternatively, virtualization manager 168 may run in a VM, e.g. in one of hosts 228-239. One example of a virtualization manager is the vCenter Server™ product available from VMware, Inc. Virtualization manager 168 is configured to carry out administrative tasks for network 200, including managing hosts 228-239, managing VMs 140-163 running within each host 228-239, provisioning VMs, transferring VMs from one host to another host, transferring VMs from network 200 to another network or data center (not shown), and load balancing between hosts 228-239, and between network 200 and other networks.

Controller 170 works in conjunction with virtualization manager 168 to migrate virtual machines 140-163 between hosts 128-139 for more efficient transmission of multicast packets, resulting in less congestion within network 100, as further discussed with reference to FIGS. 5-7 below. Examples of tools that may be used to perform a VM migration include VMotion™, which is commercially available from VMware, Inc. of Palo Alto, Calif. As used herein, a "migration" of a VM or a "transfer" of a VM is the moving of a VM from a source host to a destination host, such that after the migration, the VM is no longer located within the source host and is located within the destination host.

Figure 3:
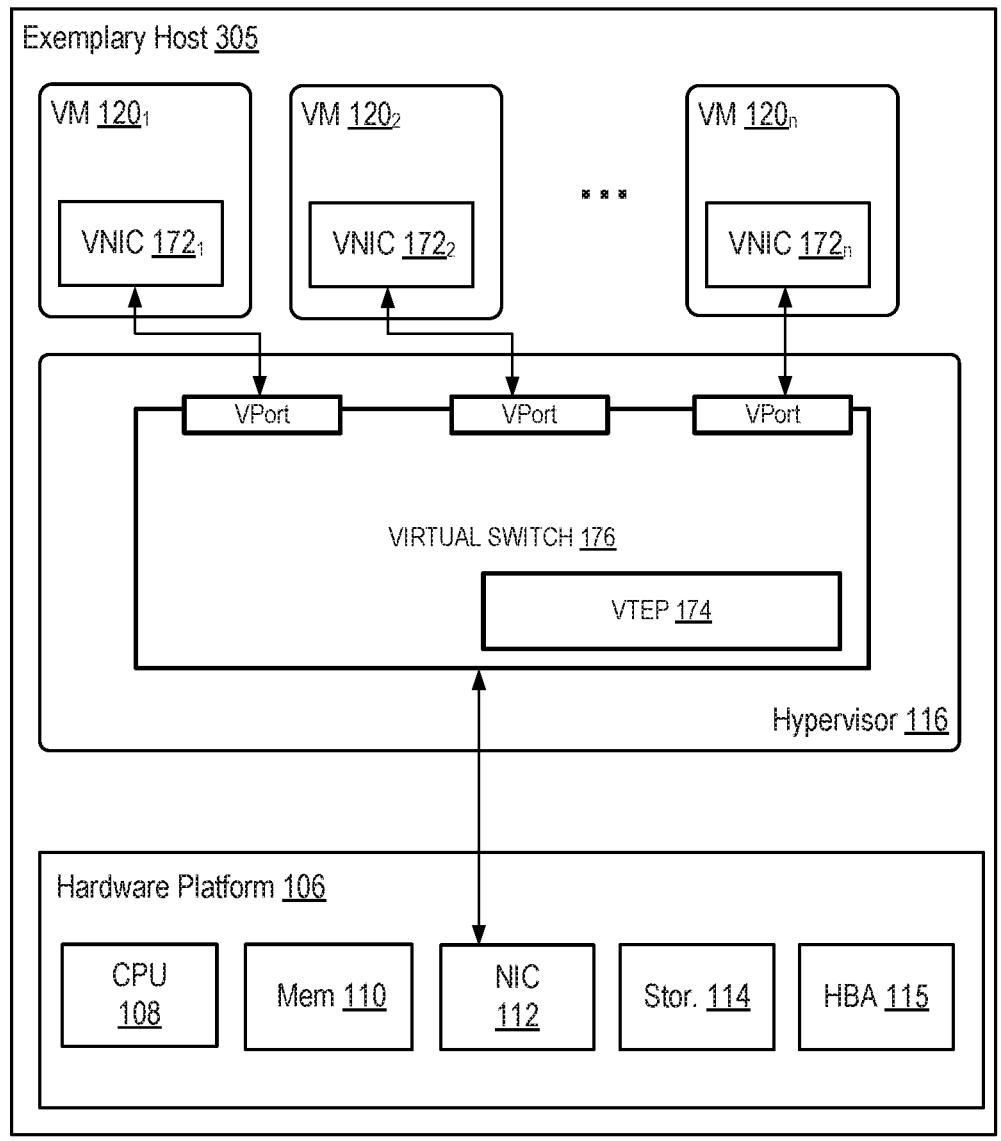
FIG. 3 depicts a block diagram of an exemplary host, according to an embodiment.

One of hosts 228-239 is depicted in FIG. 3 as exemplary host 305. Other hosts 228-239 may include similar components. Host computer system 305 may be constructed on a server grade hardware platform 106, such as an x86 architecture platform. As shown in FIG. 2, hardware platform 106 of exemplary host 305 includes one or more processors (CPUs) 108, system memory 110, a physical network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and may be stored in memory 110 and in local storage 114. Memory 110 is a device allowing information, such as executable instructions, cryptographic keys, virtual disks, configurations, and other data, to be stored and retrieved. Memory 110 is where programs and data are kept when the processor is actively using them. Memory 110 may be a byte-address sable, random access memory, and memory 110 may include, for example, one or more random access memory (RAM) modules. Physical network interface 112 enables host 305 to communicate with another device (e.g., other hardware computing platforms, entities, or host machines) via a communication medium, such as via network 166 or inter-subnet routing 164. Network interface 112 may be one or more network adapters, also sometimes referred to as Network Interface Cards (NICs). Storage system 114 represents one or more persistent storage devices (e.g., one or more hard disks, flash memory modules, solid state disks, and optical disks) in host computer system 305.

As shown, exemplary host 305 is configured to provide a virtualization layer that abstracts processor, memory, storage, and networking resources of hardware platform 106 into multiple virtual machines 120₁ to 120ₙ (collectively referred to as VMs 120) that run concurrently on the same hosts. VMs 140-163 of FIG. 2 may be among VMs 120₁ to 120ₙ of FIG. 3. VMs 120 run on top of a software interface layer, referred to herein as a hypervisor 116, that enables sharing of the hardware resources of exemplary host 305 by VMs 120. One example of a hypervisor 116 that may be used is a VMware ESXi™ hypervisor provided as part of the VMware vSphere® solution made commercially available from VMware, Inc. of Palo Alto, Calif. Hypervisor 116 may run on top of the operating system of host 305 or directly on hardware components of host 305.

Hypervisor 116 includes a virtual switch 176, which serves as an interface between the hosted virtual machines 120, NIC 112, as well as other physical resources available on exemplary host machine 305. Hypervisor 116 further includes a hypervisor-based Virtual Extensible Local Area Network (VXLAN) tunnel endpoint (VTEP) 174 which may be implemented in software by virtual switch 176 (or outside of virtual switch 176 and functionally coupled to virtual switch 176 using forwarding tables). Accordingly, VTEP 174 is responsible for providing VTEP services for each of the VMs 120 on the same host machine 305 as VTEP 174.

In alternate embodiments, virtual switch 176, VTEP 174, and/or physical device drivers may execute in a privileged virtual machine often referred to as a "Domain zero", "root-", or "parent—partition." Each of the virtual machines 120 includes a virtual network interface card (VNIC) 134, which is responsible for exchanging packets between the virtual machine 120 and hypervisor 116. VNICs 134 may be, in some cases, a software abstraction of a physical network interface card. Each virtual machine 120 is connected to a virtual port (vport) provided by virtual switch 176, and virtual switch 176 is connected to physical network interface 112 to allow network traffic to be exchanged between virtual machines 120 executing on host machine 305 and other network destinations such as virtual machines hosted by other host machines (e.g., host machines 228-239).

Figure 4:
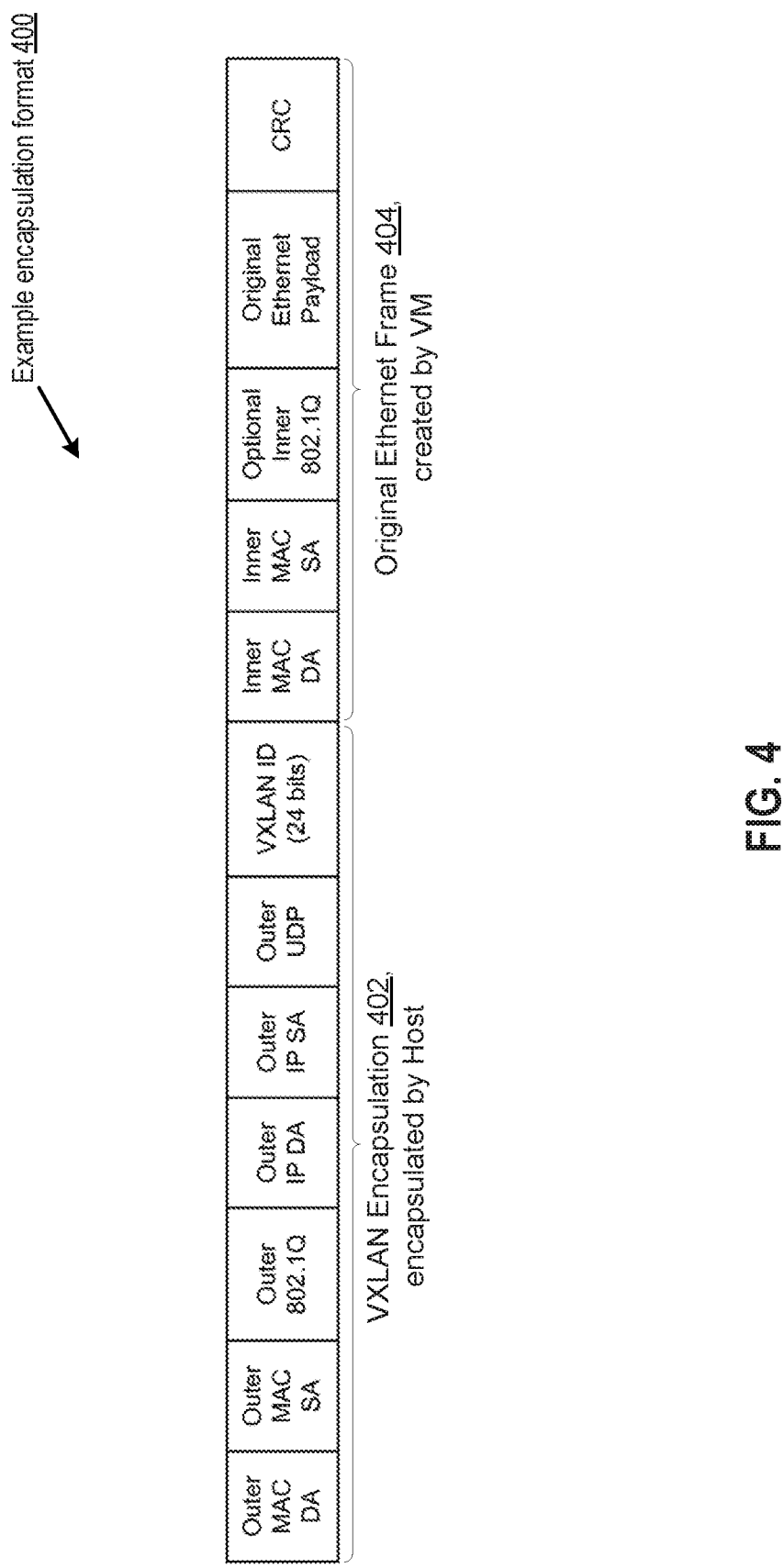
FIG. 4 depicts a block diagram of an example encapsulation format 400 per the VXLAN protocol, according to an embodiment.

The logical VM network of FIG. 2 is implemented by encapsulating data packets that are generated by VMs 140-163 for delivery through the underlying physical network. FIG. 4 depicts a block diagram of an example encapsulation format 400 per the VXLAN protocol, for a data packet generated by a VM within one of hosts 228-239. For example, assume VM 140 running on host 228 is sending a data packet to VM 148 running on host 232. VM 140 may generate an IP/MAC packet with the address (e.g., media access control (MAC) address and/or internet protocol (IP) address) of VM 140 and the address (e.g., MAC address and/or IP address) of VM 148. The outer-most portion of this VM-generated packet would be the original Ethernet frame 404, as depicted in FIG. 4. The original packet generated by the source virtual machine may be referred to as an "inner packet."

VM 140 may then send the generated packet to virtual switch 176 implemented in hypervisor 116. Having received the packet, virtual switch 176 then utilizes VTEP 174 to encapsulate the packet received from VM 140 to generate an encapsulated packet. The outer-most portion of this host-generated packet would be VXLAN encapsulation 402, as depicted in FIG. 4. The encapsulated packet generated by the host may be referred to as an "outer packet."

A header of the inner packet, shown in FIG. 4 as original Ethernet frame 404, may be referred to as an inner header. The inner header includes the address of the source virtual machine (VM 140), set as the source address, and including the address of the destination virtual machine (VM 148), set as the destination address. When encapsulating the packet, the source VTEP (e.g., VTEP 174 of source host machine 228) may further generate an outer header as part of the outer packet. The outer header is referred to in FIG. 4 as VXLAN encapsulation 402. The outer header may include a source address of the source VTEP as well as a destination address of a VTEP (e.g., destination VTEP) associated with the destination virtual machine (e.g., a virtual machine running on destination host machine 232). Accordingly, in the overlay network, the outer header is used for forwarding the encapsulated packet through the overlay network from the source VTEP to the destination VTEP.

After encapsulating the packet, in some embodiments, virtual switch 176 may then pass the encapsulated packet to the network layer of hypervisor 116 for further processing (e.g., encrypting the packet utilizing a security protocol implemented therein). The network layer then sends the encapsulated packet to NIC 112 for transmission to the destination host machine running the destination virtual machine.

Once destination host machine 232 receives the encapsulated packet, its network layer passes the encapsulated packet to the destination virtual switch implementing the destination VTEP. The destination VTEP then extracts the inner packet and uses the inner header of the decapsulated original packet to forward the original packet to the destination virtual machine. For example, the inner header of the decapsulated original packet may contain a MAC address of the destination virtual machine 148 that the destination VTEP may use to forward the packet to destination virtual machine 148.

In certain aspects, each of VMs 120 on exemplary host machine 305, as well as VMs on the other host machines (e.g., host machine 228-239) in network 200, may be configured in the logical overlay network as connected to the same "logical switch," meaning that VMs 120 on exemplary host machine 305 as well as VMs on the other host machines are part of the same logical layer-2 network/broadcast domain in the logical overlay network. The logical layer-2 network/broadcast domain may be identified by a network identifier (e.g., VXLAN network identifier (VNI)). A VTEP may maintain the VM MAC-VTEP IP mapping of the VXLAN networks to which its VMs connect, typically through traffic learning or through control plane implementation such as by obtaining data from controller 170.

Presence of a logical, overlay network connecting VMs allows for creation of "overlay" multicast groups and "underlay" multicast groups, as well as for mapping between an "overlay" multicast IP address and a physical "underlay" multicast IP address. An overlay multicast group is a multicast group whose members are VMs, and an underlay multicast group is a multicast group whose members are physical hosts (e.g., VTEPs). An overlay multicast group may also be a separate VXLAN network that maps to a physical underlay multicast group. For broadcast, unknown unicast, and multicast traffic inside a logical network, VXLAN leverages IP multicast.

For example, assume overlay multicast IP address 229.0.0.1 maps to underlay multicast IP address 238.0.0.1. Referring to FIG. 2, overlay multicast IP address 229.0.0.1 may have as members VMs 140, 142, 144, and 148. VMs 140, 142, 144, and 148 are located on hosts 228, 230, and 232. Underlay multicast IP address 238.0.0.1 would need to at least have as members the hosts 228, 230, and 232 so as to deliver packets to all VMs within overlay multicast IP group 229.0.0.1.

Figure 5A:
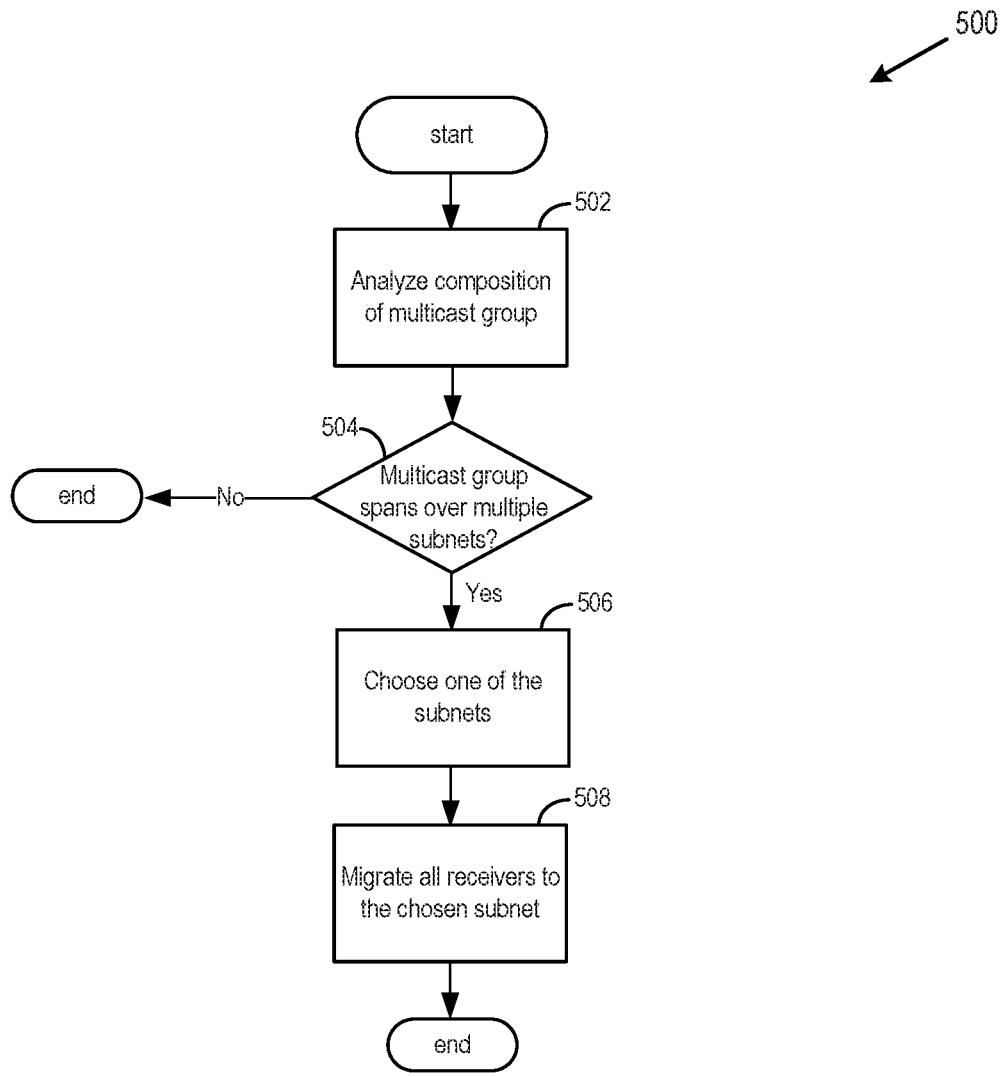
FIG. 5A depicts a flow diagram of a method of reducing network traffic within a network by migrating VMs to a single subnet.
Figure 5B:
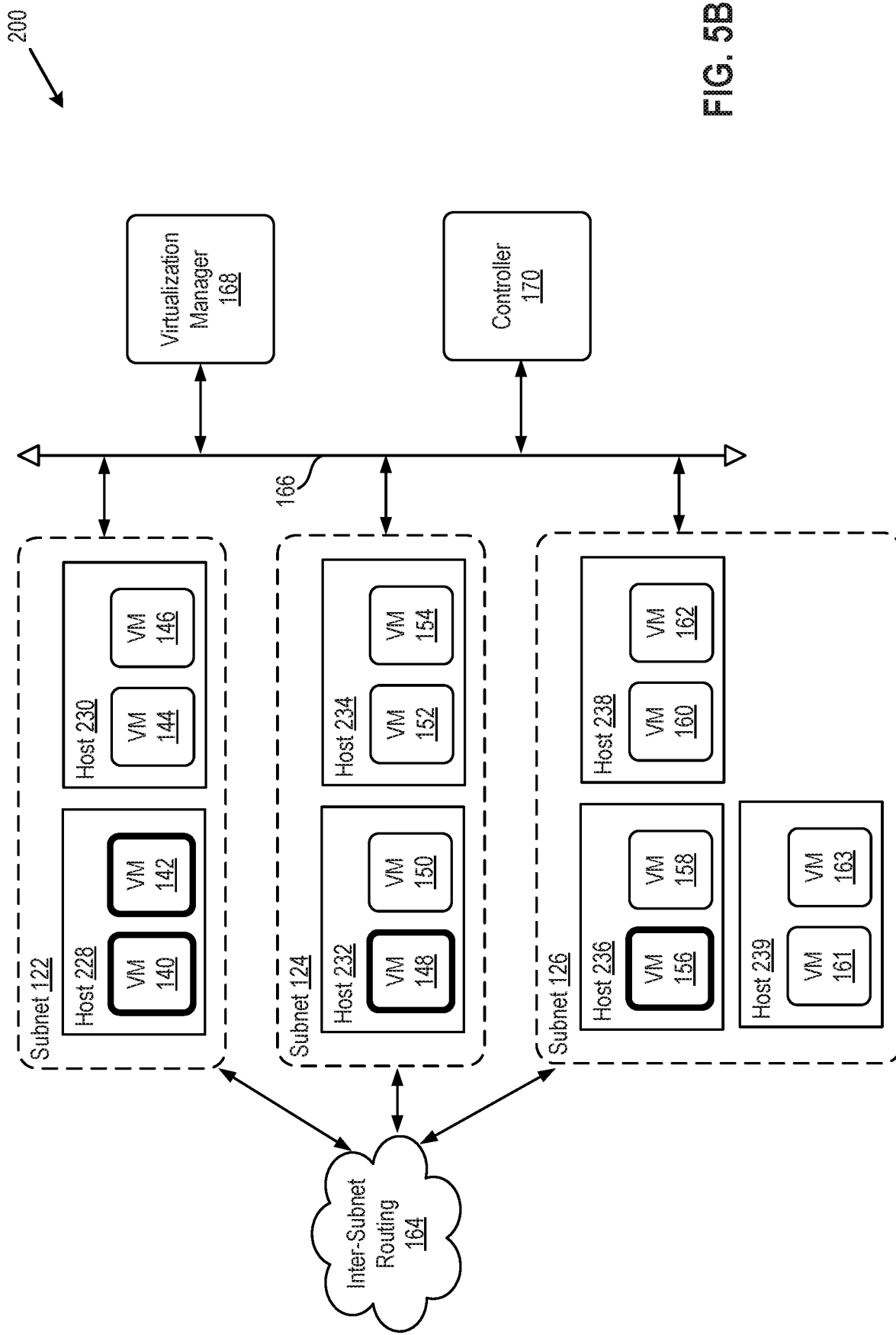
FIG. 5B depicts a block diagram of an exemplary arrangement of network components prior to exemplary execution of the method of FIG. 5A.
Figure 5C:
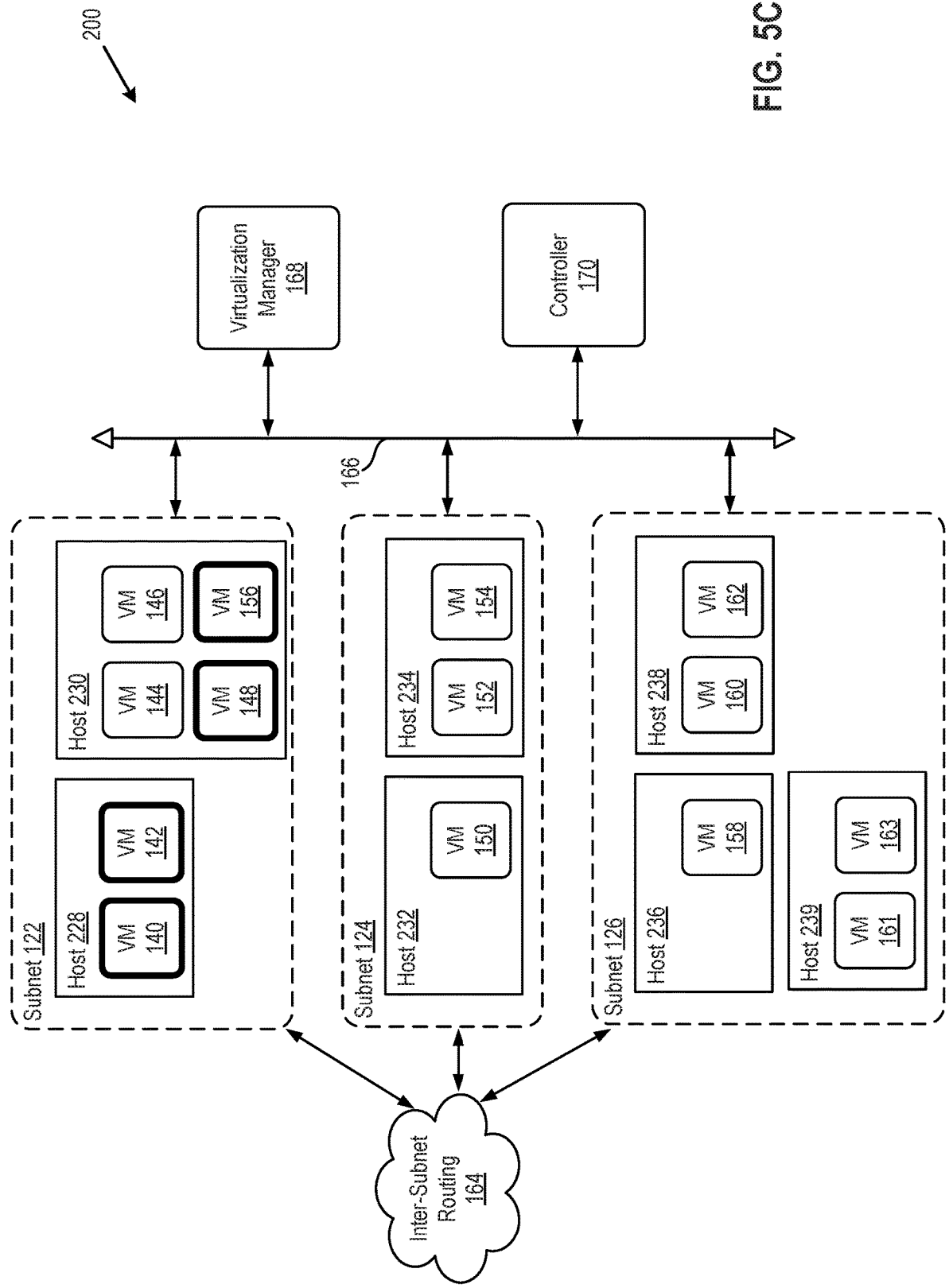
FIG. 5C depicts a block diagram of an exemplary arrangement of network components after exemplary execution of the method of FIG. 5A.

Placement of VMs among subnets 122-126 may result in congestion within network 200 that can be avoided with improved placement. FIG. 5A depicts a flow diagram of a method 500 of reducing network traffic within network 200 by migrating VMs to a single subnet. For example, referring to FIG. 5B, an overlay multicast group may consist of VMs 140, 142, 148, and 156, as shown in FIG. 5B by the bolded outline of each of these VMs. These VMs span over three subnets, 122, 124, and 126. When a packet is sent to this multicast group, the packet must be replicated to three separate subnet proxy endpoints and sent over inter-subnet routing 164. If VMs 140, 142, 148 and 156 can be moved to fewer (e.g., just one) of subnets 122-124, replication and sending of packets would be reduced, which would reduce traffic in network 200. For example, as shown in FIG. 5C, VMs 140, 142, 148 and 156 may all be moved to subnet 122.

At block 502, controller 170 analyzes composition of a multicast group. Controller 170 analyzes the multicast group to obtain information on the number of subnets spanned by the given multicast group. As used with reference to FIG. 5A, a "given multicast group" is the multicast group chosen for analysis in block 502.

Controller 170 may analyze composition with reference to an overlay group, underlay group, or both. With reference to an overlay multicast group, controller 170 may analyze to determine whether the VMs of the overlay multicast group span over several subnets. With reference to an underlay multicast group, controller 170 may analyze to determine whether the hosts of the underlay multicast group span over several subnets. Controller 170 maintains information on memberships of overlay and underlay multicast groups, as well as information on mappings between overlay and underlay multicast groups. Controller 170 has necessary information to determine the number of subnets spanned by the multicast, and if controller 170 lacks any required information, then controller 170 may query the component of network 200 that can provide the required information.

Because controller 170 has mapping information between overlay and underlay multicast groups, controller 170 may analyze an underlay group to obtain information on VMs associated with the underlay group, by referencing mapping information about overlay groups that map to that underlay group. Similarly, controller 170 may analyze an overlay group to obtain information on hosts associated with the overlay group, by referencing either mapping information of the overlay group, or by referencing information on hosts associated with VMs of the overlay group.

At block 504, controller 170 determines whether the multicast group spans over multiple subnets. If the multicast group spans over multiple subnets, method 500 continues to block 506. If the multicast group does not span over multiple subnets, then method 500 ends.

At block 506, controller 170 chooses one of the multiple subnets that contain at least one receiver of the multicast group. The chosen subnet is the destination subnet to which some or all VMs of the multicast group will be migrated. The choice of the destination subnet may depend on various factors, such as resources available on that subnet and the number of multicast receiver VMs already present on that subnet. That is, for example, the destination subnet may be chosen based on the subnet already having most of the receiver VMs, which would minimize the number of VM migrations needed. The destination subnet may also be chosen based on the destination subnet having enough resources to host additional VMs (e.g., all VMs) of the multicast group. The destination subnet may also be chosen based on other factors and on a combination of factors.

At block 508, controller 170 determines which VM(s) to migrate to which destination host(s) within the chosen destination subnet, and provides this information to virtualization manager 168. Virtualization manager 168 migrates VM(s) from their source host(s) to destination host(s) as per the information provided by controller 170. As part of block 508, controller 170 updates its internal information regarding placement of VMs, membership of multicast groups, mapping information, etc., as needed, as VM migration(s) successfully complete. Optionally, controller 170 then transmits this updated information to all or to some hosts within network 200. At the conclusion of block 508, method 500 ends.

It should be noted that, during method 500, rather than migrating all VMs of a multicast group to a single subnet, the VMs may be migrated to a set of subnets that is smaller than the original set of subnets comprised by the multicast group prior to VM migration. Reducing the number of subnets of a multicast group improves efficiency in situations when all VMs may not be placed within a single subnet, such as in situations where no single subnet has enough resources to hold all VMs of a multicast group.

Figure 6A:
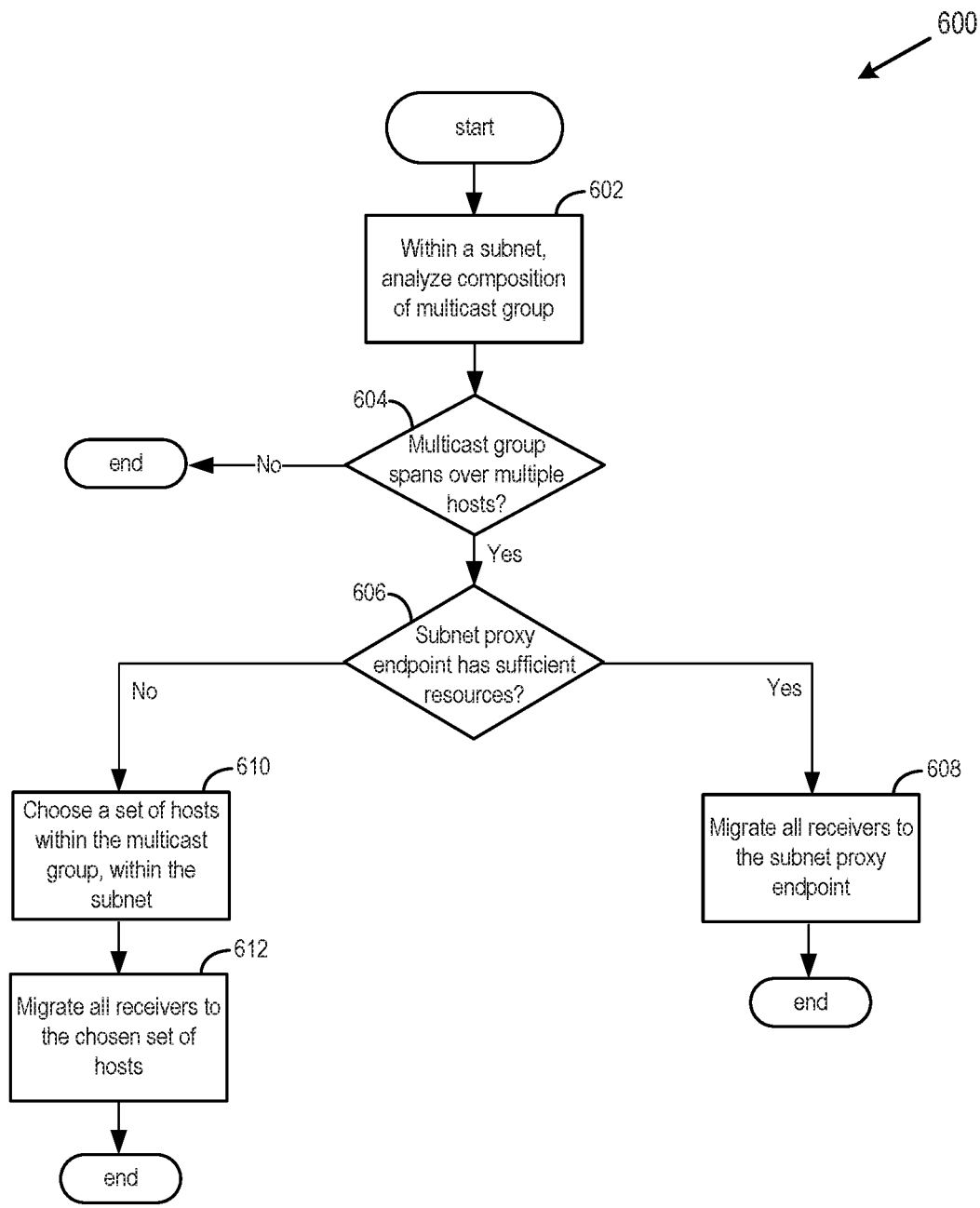
FIG. 6A depicts a flow diagram of a method of reducing network traffic within a network by migrating VMs to a single host within a subnet, or to a minimum number of hosts within a subnet.
Figure 6B:
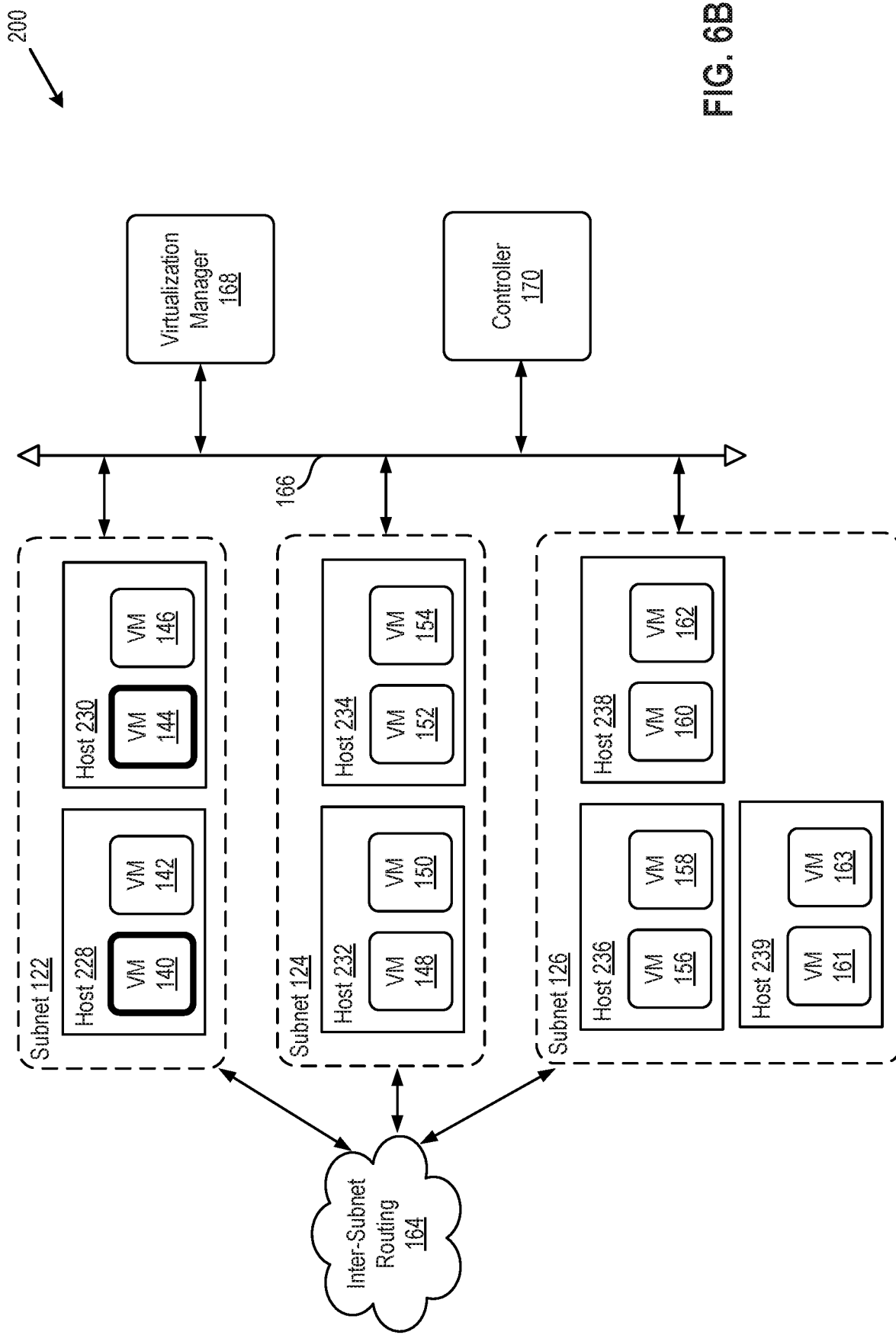
FIG. 6B depicts a block diagram of a first exemplary arrangement of network components prior to a first exemplary execution of the method of FIG. 6A.

Within a single subnet, placement of VMs among hosts 228-239 may result in congestion within network 200 that can be avoided with improved placement. FIG. 6A depicts a flow diagram of a method 600 of reducing network traffic within network 200 by migrating VMs to a single host within a subnet, or to a minimum number of hosts within a subnet. For example, referring to FIG. 6B, an overlay multicast group may consist of VMs 140 and 144, as shown in FIG. 6B by the bolded outlines. These VMs span over two hosts, 228 and 230. When a packet is sent to this multicast group, the packet must be replicated to two separate hosts. If VMs 140 and 144 can be moved to just one of hosts 228 or 230, such as to host 228 as shown in FIG. 6C, replication and sending of packets would be reduced, which would reduce traffic in network 200.

In another example, two overlay multicast groups 229.0.0.1 and 229.0.0.2 may map to the same underlay group 238.0.0.1, as shown in table 650 of FIG. 6D. Referring to FIG. 6D, overlay group 229.0.0.1 may have as members VM 156 of host 236 and VM 161 of host 239, as shown in FIG. 6D with a bolded-solid outline. Overlay group 229.0.0.2 may have as members VM 158 of host 236 and VM 160 of host 238, as shown in FIG. 6D with a bolded-dotted outline. Together, overlay multicast groups 229.0.0.1 and 229.0.0.2 span hosts 236, 238, and 239, which means that underlay group 238.0.0.1 has as members hosts 236, 238, and 239. When a packet is sent to overlay group 229.0.0.1, VTEP 174 will map 229.0.0.1 to underlay group 238.0.0.1, and the packet will be transmitted to all three hosts 236, 238, and 239, even though only hosts 236 and 239 need to receive the packet for overlay group 229.0.0.1. Host 238 will needlessly receive the packet intended for overlay group 229.0.0.1. To reduce network congestion, VM 161 may be migrated from host 239 to host 238, as shown in FIG. 6E. This will result in the two overlay groups, 229.0.0.1 and 229.0.0.2, each spanning over hosts 236 and 238, eliminating needless processing of received packets by host 239. For a further optimization, all VMs of the two overlay multicast groups, 156, 161, and 160 may be moved to the same host within subnet 126. In a yet further optimization, all VMs of the two overlay multicast groups, 156, 161, and 160 may be moved to the subnet proxy endpoint of subnet 126, eliminating the need for local replication within subnet 126.

In an embodiment, method 600 is performed after conclusion of method 500, for the same multicast group as method 500. In some embodiments, method 600 is performed independently of method 500.

At block 602, controller 170 analyzes composition of a multicast group within a single subnet. The multicast group analyzed may span over multiple subnets or a single subnet. Similarly to method 500, the analyzed multicast group may be an underlay or an overlay multicast group, as discussed above with reference to step 502. Method 600 may be performed for each subnet within network 200.

At block 604, controller 170 determines whether the multicast group spans over multiple hosts within the same, given subnet. As used with reference to FIG. 6A, a "given subnet" is the subnet of block 602. If the given subnet has several receiver hosts of the multicast group, then method 600 continues to block 606. If all VMs of the multicast group in the given subnet are located on a single host, then method 600 ends.

At block 606, controller 170 determines whether the subnet proxy endpoint of the given subnet has enough resources to host all VMs of the multicast group that are within the given subnet. If so, method 600 continues to block 608. If the subnet proxy endpoint of the given subnet does not have enough resources for all the receiver multicast VMs of the subnet, then method 600 continues to block 610.

At block 608, controller 170 decides which VM(s) to migrate to the subnet proxy endpoint of the given subnet, and provides this information to virtualization manager 168. Virtualization manager 168 migrates VM(s) from their source host(s) to subnet proxy endpoint as per the information provided by controller 170. As part of block 608, controller 170 updates its internal information regarding placement of VMs, membership of multicast groups, mapping information, etc., as needed, as VM migration(s) successfully complete. Optionally, controller 170 then transmits this updated information to all or to some hosts within network 200. At the conclusion of block 608, method 600 ends.

In certain embodiments, block 608 is preferred in the flow of method 600 over block 610. Preference is given to migrating VMs to subnet proxy endpoint because the subnet proxy endpoint will be receiving all packets that arrive at the subnet regardless of whether the subnet proxy endpoint hosts receiver VMs. Network congestion would be reduced if receiver VMs were already located on the subnet proxy endpoint so that the subnet proxy endpoint does not need to replicate the received packet and send the packet to other hosts within its subnet.

At block 610, controller 170 chooses a set of hosts to which to migrate virtual machine(s). At block 610, controller 170 attempts to reduce or minimize the number of hosts to which a packet must be replicated within a subnet. The reduction or minimization may be performed by various techniques, such as placing the maximum number of receiver VMs on the subnet proxy endpoint, and then placing the rest of the receiver VMs on a second host associated with the multicast group and having the most available resources to host additional VMs. If the second host does not have enough resources to hold the rest of the receiver VMs, then a third host with the most resources may be chosen for placement of receiver VMs, and this process may continue until the receiver VMs are clustered within a reduced and/or minimized number of hosts. Other techniques may be used for reducing the number of hosts hosting receiver VMs within a subnet, consistent with teachings herein.

At block 612, controller 170 decides which VM(s) to migrate to which destination host(s) within the given subnet, and controller 170 provides this information to virtualization manager 168. In an embodiment, controller 170 decides which VM(s) to migrate to which host(s) based on a goal of minimizing the number of VM migrations that need to be performed by virtualization manager 168. Virtualization manager 168 migrates VM(s) from their source host(s) to destination host(s) as per the information provided by controller 170. As part of block 612, controller 170 updates its internal information regarding placement of VMs, membership of multicast groups, mapping information, etc., as needed, as VM migration(s) successfully complete. Optionally, controller 170 then transmits this updated information to all or to some hosts within network 200. At the conclusion of block 612, method 600 ends.

Figure 7A:
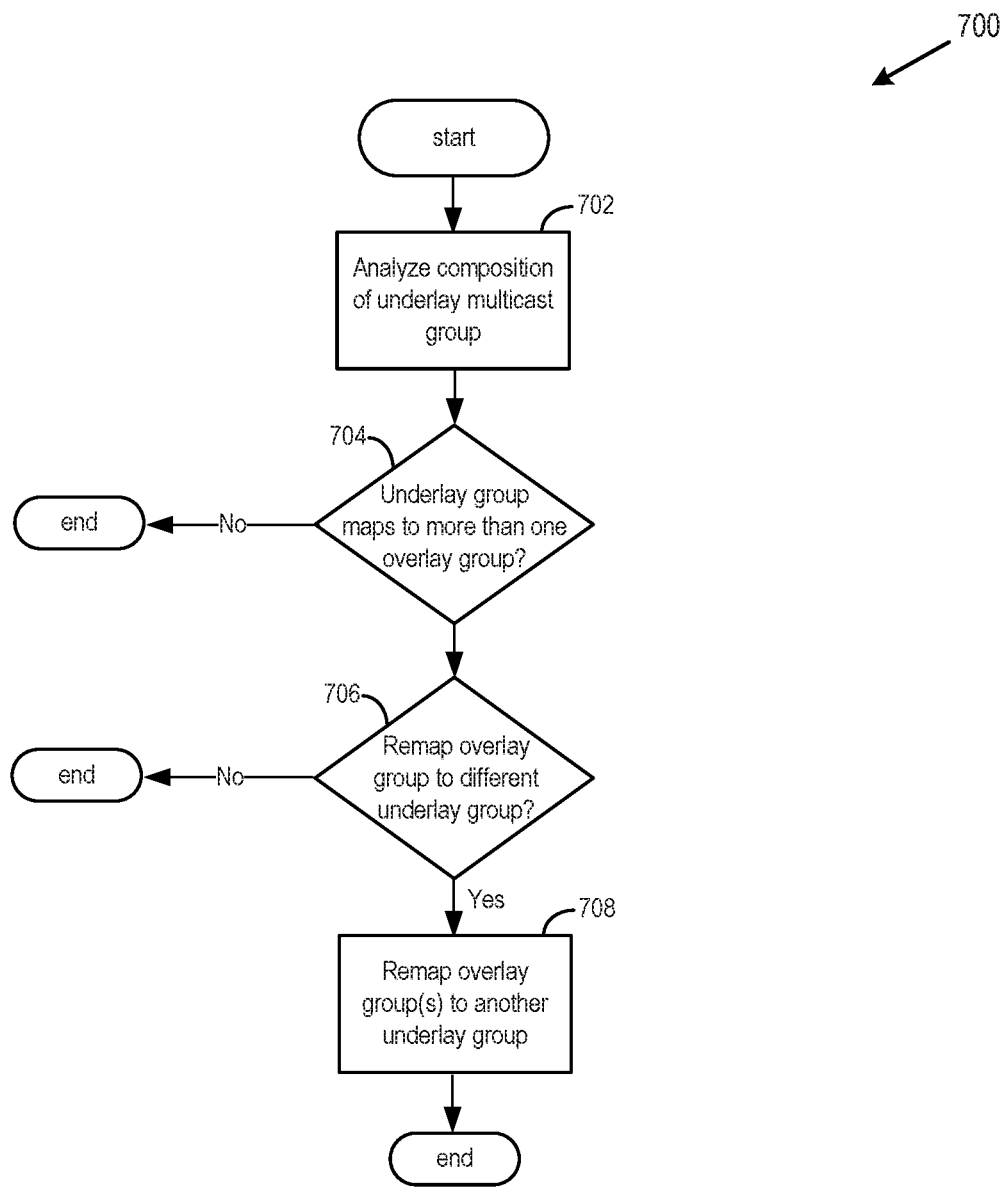
FIG. 7A depicts a flow diagram of a method of reducing network traffic within a network by modifying mapping between overlay and underlay multicast groups.
Figure 7B:
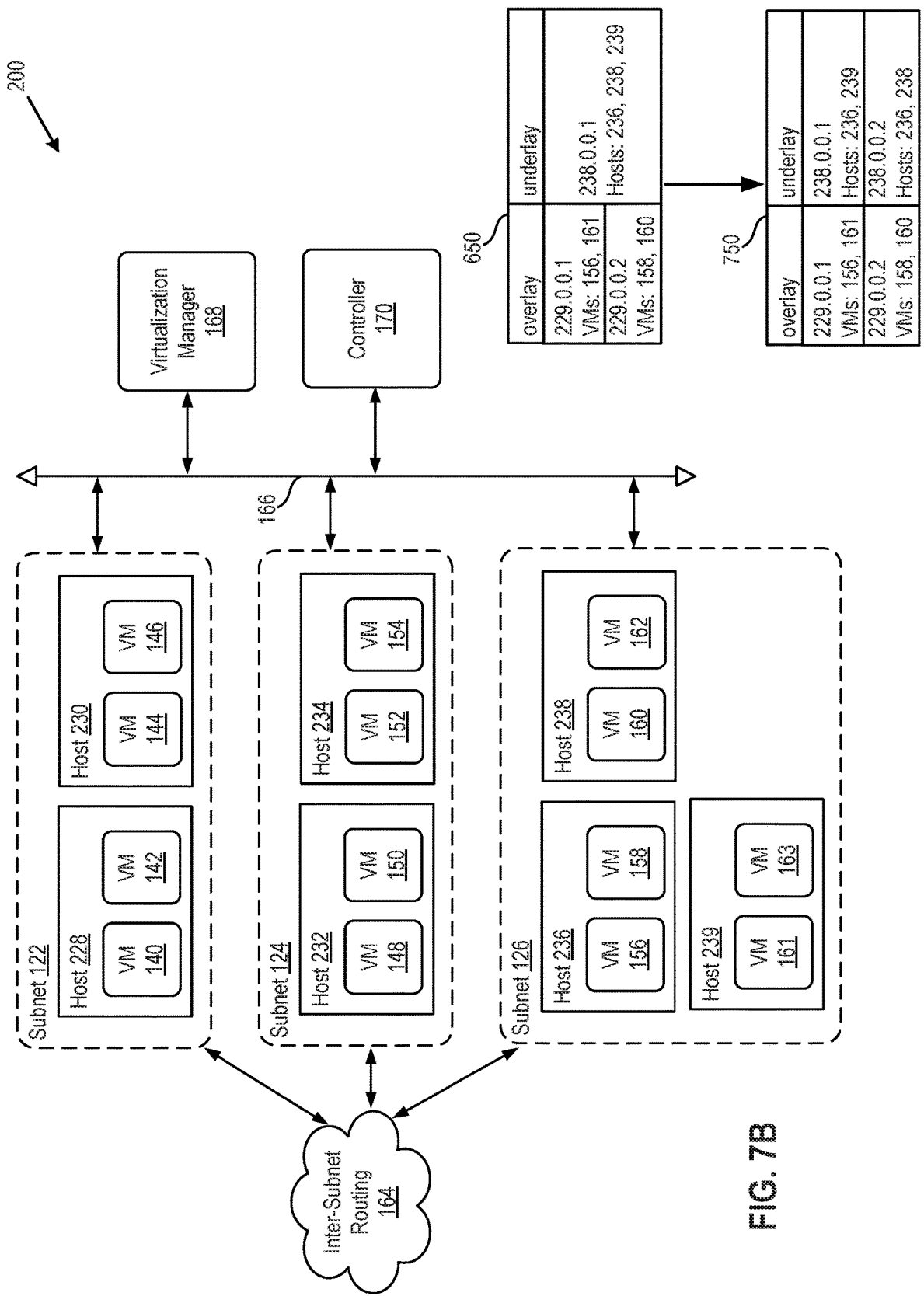
FIG. 7B depicts a block diagram of an exemplary arrangement of network components prior to exemplary execution of the method of FIG. 7A and after exemplary execution of the method of FIG. 7A.

Certain mappings between overlay multicast group(s) to an underlay multicast group may result in congestion within network 200 that can be avoided with improved mapping. FIG. 7A depicts a flow diagram of a method 700 of reducing network traffic within network 200 by modifying mapping between overlay and underlay multicast groups. For example, referring to FIG. 7B, assume overlay multicast IP address 229.0.0.1 and overlay multicast IP address 229.0.0.2 both map to underlay multicast IP address 238.0.0.1, as shown in table 650. When a packet is sent to multicast group 229.0.0.1, hosts with receiver VMs for both, group 229.0.0.1 and 229.0.0.2, receive the packet, even though only hosts hosting receiver VMs of group 229.0.0.1 need to receive the packet. If group 229.0.0.1 is a high-traffic group, then hosts associated with group 229.0.0.2 receive a high amount of traffic that is processed and then discarded, resulting in wasteful use of resources of the hosts of the group 229.0.0.2 and wasteful use of resources of network 200. One of these overlay groups may be remapped to a separate underlay group to reduce traffic to hosts that do not have receiver VMs of the destination overlay group, as shown in table 750 of FIG. 7B.

At block 702, controller 170 analyzes composition of an underlay multicast group to determine which overlay multicast group(s) map to that underlay multicast group. Controller 170 also analyzes composition of an underlay multicast group to determine whether any of the mapped overlay groups have characteristics (such as high traffic rate) that would lead to the conclusion that they should be remapped from the given underlay multicast group to another underlay multicast group.

At block 704, controller 170 determines whether the underlay group maps to more than one overlay group. If not, then method 700 ends. If so, then method 700 continues to block 706.

At block 706, controller 170 determines whether to remap any of the multiple overlay groups that map to the given underlay group. This determination may be based on various factors, such as whether any of the overlay groups are particularly high traffic groups. If so, resource usage may be improved if the particularly high-traffic overlay groups are remapped to a different existing or new underlay group, such as for example, by separating all high-traffic overlay groups into their own underlay groups with one-to-one correspondence between overlay and underlay groups. If controller 170 determines that no overlay multicast group should be remapped, then method 700 ends. If controller 170 determines that at least one overlay multicast group should be remapped to a different existing or new underlay group, then method 700 continues to block 708.

At block 708, controller 170 remaps overlay group(s) to new or existing underlay group(s), as determined at block 706. As part of block 708, controller 170 updates its internal information regarding placement of VMs, membership of multicast groups, mapping information, etc., as needed, as VM migrations successfully complete. Optionally, controller 170 then transmits this updated information to all or to some hosts within network 200. After block 708, method 700 ends.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of reducing congestion within a network, the network comprising a plurality of host machines and a plurality of virtual machines (VMs) running on the plurality of host machines, the method comprising:
for a first underlay multicast group, the first underlay multicast group being associated with a first overlay multicast group comprising a first set of VMs and a second overlay multicast group comprising a second set of VMs, determining if the first underlay multicast group includes multiple host machines of the plurality of host machines including a first host machine and a second host machine, wherein the multiple host machines are in a same subnet; and
when it is determined that the first underlay multicast group includes multiple host machines, migrating at least one VM of the first set of VMs or the second set of VMs from the first host machine to the second host machine, such that the first host machine no longer hosts any of the first set of VMs and the second set of VMs.

2. The method of claim 1, wherein the second host machine comprises a subnet proxy endpoint for one of a plurality of subnets.

3. The method of claim 1, wherein migrating at least one VM of the first set of VMs or the second set of VMs from the first host machine to the second host machine further comprises migrating all VMs of the first set of VMs and the second set of VMs to the second host machine.

4. The method of claim 1, wherein each VM of the first set of VMs of the first overlay multicast group is addressable using a multicast IP address associated with the first overlay multicast group.

5. The method of claim 1, wherein the multiple host machines of the first underlay multicast group are addressable using a multicast IP address associated with the first underlay multicast group.

6. A method of reducing congestion within a network, the network comprising a plurality of host machines and a plurality of virtual machines (VMs) running on the plurality of host machines, the method comprising:
for a first underlay multicast group comprising at least one host machine of the plurality of host machines, determining if the first underlay multicast group is associated with a plurality of overlay multicast groups each associated with at least one VM of the plurality of VMs; and
when it is determined that the first underlay multicast group is associated with the plurality of overlay multicast groups, changing an association of a first overlay multicast group of the plurality of multicast groups from the first the first underlay multicast group to a second underlay multicast group.

7. The method of claim 6, wherein the second underlay multicast group is an existing underlay multicast group.

8. The method of claim 6, wherein the second underlay multicast group is a newly created underlay multicast group.

9. The method of claim 6, wherein the first overlay multicast group has a relatively high amount of network traffic compared to other overlay multicast groups of the plurality of overlay multicast groups.

10. The method of claim 6, wherein each host machine of the first underlay multicast group is addressable using a multicast IP address associated with the first underlay multicast group.

11. A computer system operating on a physical network comprising:
a plurality of host machines, including a first host machine and a second host machine;
a logical overlay network implemented on the physical network;
a plurality of virtual machines (VMs) running on the plurality of host machines, wherein the plurality of VMs comprises a first set of VMs and a second set of VMs, further wherein the plurality of VMs are connected by the logical overlay network;
a controller configured to:
for a first underlay multicast group, the first underlay multicast group being associated with a first overlay multicast group comprising the first set of VMs and a second overlay multicast group comprising the second set of VMs, determining if the first underlay multicast group includes multiple host machines of the plurality of host machines including the first host machine and the second host machine, wherein the multiple host machines are in a same subnet; and a virtualization manager configured to:
when it is determined that the first underlay multicast group includes multiple host machines, migrating at least one VM of the first set of VMs or the second set of VMs from the first host machine to the second host machine, such that the first host machine no longer hosts any of the first set of VMs and the second set of VMs.

12. The computer system of claim 11, wherein the second host machine comprises a subnet proxy endpoint for one of a plurality of subnets.

13. The computer system of claim 11, wherein migrating at least one VM of the first set of VMs or the second set of VMs from the first host machine to the second host machine further comprises migrating all VMs of the first set of VMs and the second set of VMs to the second host machine.

14. The computer system of claim 11, wherein each VM of the first set of VMs of the first overlay multicast group is addressable using a multicast IP address associated with the first overlay multicast group.

15. The computer system of claim 11, wherein the multiple host machines of the first underlay multicast group are addressable using a multicast IP address associated with the first underlay multicast group.

* * * * *